US010629243B2

(12) United States Patent
Carter et al.

(10) Patent No.: US 10,629,243 B2
(45) Date of Patent: Apr. 21, 2020

(54) SYSTEMS AND METHODS FOR CREATING AND USING NAVIGABLE SPATIAL OVERVIEWS FOR VIDEO THROUGH VIDEO SEGMENTATION BASED ON TIME METADATA AND CAMERA ORIENTATION METADATA

(71) Applicant: FUJI XEROX CO., LTD., Tokyo (JP)

(72) Inventors: Scott Carter, Los Altos, CA (US); Matthew L. Cooper, San Francisco, CA (US); John Adcock, San Francisco, CA (US); Stacy Branham, Blacksburg, VA (US)

(73) Assignee: FUJI XEROX CO., LTD., Tokyo (JP)

( * ) Notice: Subject to any disclaimer, the term of this patent is extended or adjusted under 35 U.S.C. 154(b) by 108 days.

(21) Appl. No.: 15/894,748

(22) Filed: Feb. 12, 2018

(65) Prior Publication Data

US 2018/0277166 A1 Sep. 27, 2018

Related U.S. Application Data

(63) Continuation of application No. 13/775,116, filed on Feb. 22, 2013, now Pat. No. 9,892,761.

(51) Int. Cl.
*G11B 27/34* (2006.01)
*G06F 3/0485* (2013.01)
(Continued)

(52) U.S. Cl.
CPC ............ *G11B 27/34* (2013.01); *G06F 3/0482* (2013.01); *G06F 3/0485* (2013.01); *G09B 5/02* (2013.01);
(Continued)

(58) Field of Classification Search
CPC .............................. G06F 16/444; G06F 16/447
See application file for complete search history.

(56) References Cited

U.S. PATENT DOCUMENTS

2002/0097984 A1* 7/2002 Abecassis .............. G11B 19/02
386/344
2009/0003712 A1* 1/2009 Mei .................... G06K 9/00744
382/225

(Continued)

*Primary Examiner* — Abdullah Al Kawsar
*Assistant Examiner* — Kenny Nguyen
(74) *Attorney, Agent, or Firm* — Procopio, Cory, Hargreaves & Savitch LLP

(57) ABSTRACT

Systems and methods for generating an overview for videos by reconstructing a representation of underlying content and linking from points in the overview to specific points in the video. Mechanisms are provided to create three different types of navigable overviews for different types of how-to and instructional videos. A two-dimensional overview is generated when content is two-dimensional, such as instructional videos on electronic whiteboard or other flat content. The three-dimensional overview is created when the content is three-dimensional, such as how-to videos illustrating the use of specific three-dimensional tangible articles. In three-dimensional case, when 3D model is available, the video segments are directly linked to corresponding points on the model. When a model is not available, a rough overview is first created from the captured video and camera orientation metadata. When the user selects a specific location within the overview, the related video segment is automatically played to the user.

16 Claims, 14 Drawing Sheets

(51) Int. Cl.
  *G06F 3/0482* (2013.01)
  *G09B 5/02* (2006.01)
  *G11B 27/10* (2006.01)
  *H04N 21/2343* (2011.01)
  *H04N 21/8549* (2011.01)

(52) U.S. Cl.
  CPC ....... *G11B 27/105* (2013.01); *H04N 21/2343* (2013.01); *H04N 21/8549* (2013.01)

(56) References Cited

U.S. PATENT DOCUMENTS

| | | | | |
|---|---|---|---|---|
| 2009/0160856 | A1* | 6/2009 | Hoguet | G06Q 10/06 345/420 |
| 2010/0284607 | A1* | 11/2010 | Van Den Hengel | G06T 7/564 382/154 |
| 2012/0216121 | A1* | 8/2012 | Lin | H04N 21/234327 715/721 |
| 2013/0177294 | A1* | 7/2013 | Kennberg | H04N 21/21805 386/241 |
| 2013/0286161 | A1* | 10/2013 | Lv | G06K 9/00214 348/46 |

* cited by examiner

SYSTEMS AND METHODS FOR CREATING AND USING NAVIGABLE SPATIAL OVERVIEWS FOR VIDEO THROUGH VIDEO SEGMENTATION BASED ON TIME METADATA AND CAMERA ORIENTATION METADATA

CROSS-REFERENCE TO RELATED APPLICATION

This patent application claims the benefit of priority of and is a continuation of U.S. patent application Ser. No. 13/775,116 filed on Feb. 22, 2013, U.S. Pat. No. 9,892,761, the entire disclosure of which is incorporated by reference herein.

BACKGROUND OF THE INVENTION

Technical Field

The disclosed embodiments relate in general to systems and methods for navigating video content and, more specifically, to systems and methods for generating and using navigable spatial overviews for video.

Description of the Related Art

Video is notoriously difficult to navigate. The timeline is the standard video navigation control, linking the location of a cursor in a slider to a temporal position in a video. The abstraction the aforesaid navigation control provides is useful for many reasons, including that users are able to rapidly jump to different time points within the video and maintain an awareness of when in the video they currently are. However, for many how-to and instructional videos, knowing where the user is can be just as important. While there exist certain interfaces enabling users to navigate objects directly in a video, there are no solutions focused on abstractions that allow users to navigate a video spatially the same way they can use a timeline video control to navigate temporally.

Therefore, the conventional video navigation techniques are deficient due to the lack of spatial navigation solutions, as for many how-to and instructional videos, it would be more desirable for users to navigate video content using a spatial abstraction rather than a temporal abstraction (i.e., the standard timeline interface).

SUMMARY OF THE INVENTION

The embodiments described herein are directed to methods and systems that substantially obviate one or more of the above and other problems associated with conventional methods for navigating video content.

In accordance with one aspect of the inventive concepts described herein, there is provided a computer-implemented method performed in a computerized system comprising a central processing unit, a display device and a memory, the computer-implemented method performed in connection with a video of an article, the computer-implemented method comprising: using the central processing unit to segment the video based at least on time and a camera orientation metadata into a plurality of video segments; using the central processing unit to map each of a plurality of images corresponding to a plurality of sides of the article to at least one of the plurality of video segments; and playing the at least one of the plurality of video segments on the display device based on user selection.

In one or more embodiments, each or the plurality of images is a video frame selected from the video.

In one or more embodiments, the video frame is selected from the video based at least on the camera orientation metadata and an image quality of the video frame.

In one or more embodiments, the selected video frame is a highest quality video frame corresponding to a camera orientation closest to an orientation of a respective one of the plurality of sides of the article.

In one or more embodiments, the video is segmented additionally based on an orientation of a front side of the article designated by the user.

In one or more embodiments, the video is segmented additionally based on a content of the video by comparing image features extracted from frames of the video with image features extracted from the plurality of images.

In one or more embodiments, the method further comprises using the central processing unit to map a location within at least one of the plurality of images to at least one of the plurality of video segments, wherein upon detection of a selection event of the location within the at least one of the plurality of images by the user, the mapped at least one of the plurality of video segments is played.

In one or more embodiments, the playing the at least one of the plurality of video segments is performed in a graphical user interface comprising controls for selecting the displayed image from the plurality of images.

In one or more embodiments, the method further comprises marking the at least one of the plurality of video segments mapped to the displayed one of the plurality of images on a timeline of the video.

In one or more embodiments, the method further comprises generating a graphical user interface on the display device, wherein the graphical user interface displays at least two of the plurality of images, stitched into a three-dimensional model, the graphical user interface comprising controls for manipulating the displayed three-dimensional model.

In accordance with another aspect of the inventive concept, there is provided a non-transitory computer-readable medium embodying a set of computer-executable instructions, which, when executed in a computerized system comprising a central processing unit, a display device and a memory in connection with a video of an article, cause the computerized system to perform a method comprising: using the central processing unit to segment the video based at least on time and a camera orientation metadata into a plurality of video segments; using the central processing unit to map each of a plurality of images corresponding to a plurality of sides of the article to at least one of the plurality of video segments; and playing the at least one of the plurality of video segments on the display device based on user selection.

In one or more embodiments, each or the plurality of images is a video frame selected from the video.

In one or more embodiments, the video frame is selected from the video based at least on the camera orientation metadata and an image quality of the video frame.

In one or more embodiments, the selected video frame is a highest quality video frame corresponding to a camera orientation closest to an orientation of a respective one of the plurality of sides of the article.

In one or more embodiments, the video is segmented additionally based on an orientation of a front side of the article designated by the user.

In one or more embodiments, the video is segmented additionally based on a content of the video by comparing image features extracted from frames of the video with image features extracted from the plurality of images.

In one or more embodiments, the method further comprises using the central processing unit to map a location within at least one of the plurality of images to at least one of the plurality of video segments, wherein upon detection of a selection event of the location within the at least one of the plurality of images by the user, the mapped at least one of the plurality of video segments is played.

In one or more embodiments, the playing the at least one of the plurality of video segments is performed in a graphical user interface comprising controls for selecting the displayed image from the plurality of images.

In one or more embodiments, the method further comprises marking the at least one of the plurality of video segments mapped to the displayed one of the plurality of images on a timeline of the video.

In one or more embodiments, the method further comprises generating a graphical user interface on the display device, wherein the graphical user interface displays at least two of the plurality of images, stitched into a three-dimensional model, the graphical user interface comprising controls for manipulating the displayed three-dimensional model.

In accordance with yet another aspect of the inventive concept, there is provided a computerized system comprising a central processing unit, a display device and a memory storing a set of instructions executable in connection with a video of an article, the set of instructions including instructions for: using the central processing unit to segment the video based at least on time and a camera orientation metadata into a plurality of video segments; using the central processing unit to map each of a plurality of images corresponding to a plurality of sides of the article to at least one of the plurality of video segments; and playing the at least one of the plurality of video segments on the display device based on user selection.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the inventive concept, there are provided systems and methods for generating an overview for certain types of video by reconstructing a representation of the underlying content and linking from points in the overview to specific points in the video. In one embodiment, a two-dimensional overview is generated when the content is two-dimensional, such as an instructional video on an electronic whiteboard. In another embodiment, a three-dimensional overview is created when the content is three-dimensional, such as a how-to video illustrating the use of a specific three-dimensional article.

In one or more embodiments, there are provided mechanisms to create three different types of navigable overviews for different types of how-to and instructional videos. Two-dimensional overviews are useful for screencasts, whiteboard lectures, and other flat content, while three-dimensional overviews are more appropriate for demonstrations of tangible articles. Two different approaches are used when a three-dimensional model of the article is available and when it is not. In the first approach, when a model is available, the video segments are directly linked to their corresponding points on the three-dimensional model. However, when a model is not available, a rough overview is first created from the captured video in combination with certain metadata.

Figure 1:
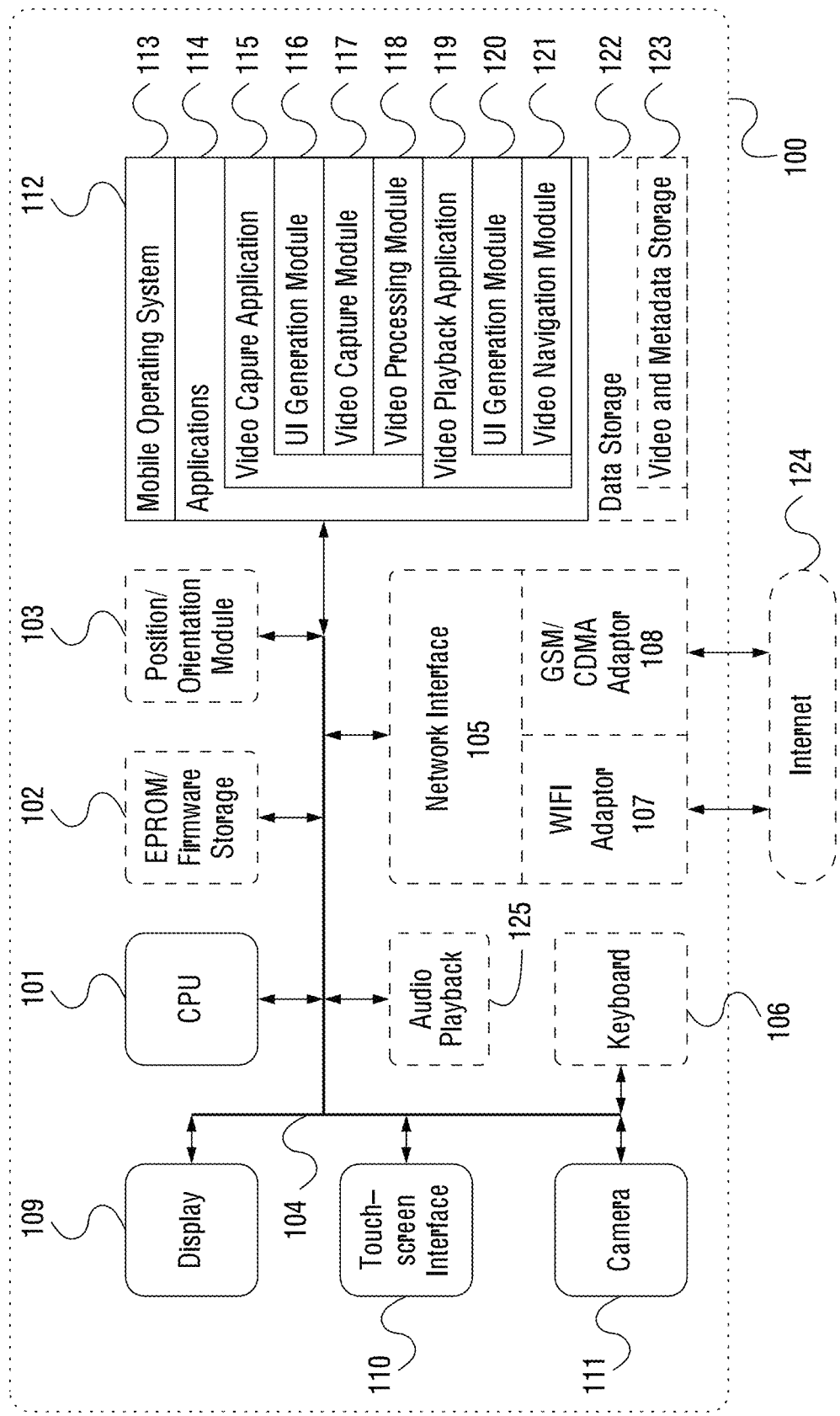
FIG. 1 illustrates an exemplary embodiment of a computerized system for performing video capture, creating spatial overviews for videos and enabling the user to navigate videos during video playback using the created spatial overviews.

FIG. 1 illustrates an exemplary embodiment of a computerized system 100 for performing video capture, creating spatial overviews for videos and enabling the user to navigate videos during video playback using the created spatial overviews. In one or more embodiments, the computerized system 100 may be implemented within the form factor of a mobile computing device, such as a smartphone, a personal digital assistant (PDA), or a tablet computer, all of which are available commercially and are well known to persons of skill in the art. In an alternative embodiment, the computerized system 100 may be implemented based on a laptop or a notebook computer. Yet in an alternative embodiment, the computerized system 100 may be an embedded system, incorporated into an electronic device with certain specialized functions, such as an electronic book (or e-book) reader. Yet in an alternative embodiment, the computerized system 100 may be implemented as a part of an augmented reality head-mounted display (HMD) systems, also well known to persons of ordinary skill in the art.

The computerized system 100 may include a data bus 104 or other interconnect or communication mechanism for communicating information across and among various hardware components of the computerized system 100, and a central processing unit (CPU or simply processor) 101 coupled with the data bus 104 for processing information and performing other computational and control tasks. Computerized system 100 also includes a memory 112, such as a random access memory (RAM) or other dynamic storage device, coupled to the data bus 104 for storing various information as well as instructions to be executed by the processor 101. The memory 112 may also include persistent storage devices, such as a magnetic disk, optical disk, solid-state flash memory device or other non-volatile solid-state storage devices.

In one or more embodiments, the memory 112 may also be used for storing temporary variables or other intermediate information during execution of instructions by the processor 101. Optionally, computerized system 100 may further include a read only memory (ROM or EPROM) 102 or other static storage device coupled to the data bus 104 for storing static information and instructions for the processor 101, such as firmware necessary for the operation of the computerized system 100, basic input-output system (BIOS), as well as various configuration parameters of the computerized system 100.

In one or more embodiments, the computerized system 100 may incorporate a display device 109, which may be also coupled to the data bus 104, for displaying various information to a user of the computerized system 100. In an alternative embodiment, the display 109 may be associated with a graphics controller and/or graphics processor (not shown). The display device 109 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 109 may be incorporated into the same general enclosure with the remaining components of the computerized system 100. In an alternative embodiment, the display device 109 may be positioned outside of such enclosure.

In one or more embodiments, the display device 109 may be implemented in a form of a projector or a mini-projector configured to project information on various objects, such as glasses worn by the user. In one or more embodiments, the display device 109 may be configured to be mountable on the head of the user. To this end, the display device 109 may be provided with suitable mounting hardware (not shown).

In one or more embodiments, the computerized system 100 may further incorporate an audio playback device 125 connected to the data bus 104 and configured to play various audio files, such as MPEG-3 files, or audio tracks of various video files, such as MPEG-4 files, well known to persons of ordinary skill in the art. To this end, the computerized system 100 may also incorporate waive or sound processor or a similar device (not shown).

In one or more embodiments, the computerized system 100 may incorporate one or more input devices, such as a touchscreen interface 110 for receiving user's tactile commands, a camera 111 for acquiring still images and video of various objects, as well as a keyboard 106, which all may be coupled to the data bus 104 for communicating information, including, without limitation, images and video, as well as user command selections to the processor 101. In an alternative embodiment, input devices may include a system for tracking eye movements of the user (not shown), which may be used to indicate to the computerized system 100 the command selection made by the user.

In one or more embodiments, the computerized system 100 may additionally include a positioning and orientation module 103 configured to supply data on the current geographical position and spatial orientation of the computerized system 100 to the processor 101 via the data bus 104. The geographical position information may be obtained by the positioning module 103 using, for example, global positioning system (GPS) technology and/or other positioning techniques such as by using information provided by proximate cell towers and/or WIFI hotspots. The orientation information may be obtained using acceleration measurements in all 3 axes, including the gravity. In one or more embodiments, the orientation metadata provided by the positioning and orientation module 103 is continuously recorded and stored in the data storage unit 122.

In one or more embodiments, the computerized system 100 may additionally include a communication interface, such as a network interface 105 coupled to the data bus 104. The network interface 105 may be configured to establish a connection between the computerized system 100 and the Internet 124 using at least one of WIFI interface 107 and the cellular network (GSM or CDMA) adaptor 108. The network interface 105 may be configured to provide a two-way data communication between the computerized system 100 and the Internet 124. The WIFI interface 107 may operate in compliance with 802.11a, 802.11b, 802.11g and/or 802.11n protocols as well as Bluetooth protocol well known to persons of ordinary skill in the art. In an exemplary implementation, the WIFI interface 107 and the cellular network (GSM or CDMA) adaptor 108 send and receive electrical or electromagnetic signals that carry digital data streams representing various types of information.

In one or more embodiments, the Internet 124 typically provides data communication through one or more sub-networks to other network resources. Thus, the computerized system 100 is capable of accessing a variety of network resources located anywhere on the Internet 124, such as remote media servers, web servers, other content servers as well as other network data storage resources. In one or more embodiments, the computerized system 100 is configured send and receive messages, media and other data, including application program code, through a variety of network(s) including Internet 124 by means of the network interface 105. In the Internet example, when the computerized system 100 acts as a network client, it may request code or data for an application program executing on the computerized system 100. Similarly, it may send various data or computer code to other network resources.

In one or more embodiments, the functionality described herein is implemented by computerized system 100 in response to processor 101 executing one or more sequences of one or more instructions contained in the memory 112. Such instructions may be read into the memory 112 from another computer-readable medium. Execution of the sequences of instructions contained in the memory 112 causes the processor 101 to perform the various process steps described herein. In alternative embodiments, hard-wired circuitry may be used in place of or in combination with software instructions to implement the embodiments invention. Thus, embodiments of the invention are not limited to any specific combination of hardware circuitry and software.

The term "computer-readable medium" as used herein refers to any medium that participates in providing instructions to processor 101 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 101 for execution. For example, the instructions may initially be carried on a magnetic disk from a remote computer. Alternatively, a remote computer can load the instructions into its dynamic memory and send the instructions over the Internet 124. Specifically, the computer instructions may be downloaded into the memory 112 of the computerized system 100 from the foresaid remote computer via the Internet 124 using a variety of network data communication protocols well known in the art.

In one or more embodiments, the memory 112 of the computerized system 100 may store any of the following software programs, applications or modules:

1. Operating system (OS) 113, which may be a mobile operating system for implementing basic system services and managing various hardware components of the computerized system 100. Exemplary embodiments of the operating system 113 are well known to persons of skill in the art, and may include any now known or later developed mobile operating systems.

2. Applications 114 may include, for example, a set of software applications executed by the processor 101 of the computerized system 100, which cause the computerized system 100 to perform certain predetermined functions, such as acquire digital images using the camera 111 or play media files using the display 109 and/or an audio playback device (not shown). In one or more embodiments, the applications 114 may include an inventive video capture application 115 and inventive video playback application 119, described below.

3. Data storage 122 may be used, for example, for storing video files 123 generated by the inventive video capture application 115 as well as other data received by the computerized system 100 over the Internet 124.

In one or more embodiments, the inventive video capture application 115 incorporate a graphical user interface generation module 116 configured to generate an inventive graphical user interface on the display 109 of the computerized system 100. The inventive video capture application 115 may further include a video capture module 117 for recording video content, and a video processing module 118 for generating an overview for the acquired video by reconstructing a representation of the underlying content and linking from points in the overview to specific points in the video.

In one or more embodiments, the inventive video playback application 119 may include a graphical user interface generation module 120 configured to generate an inventive graphical user interface providing novel video navigational capabilities to the user on the display 109 of the computerized system 100. Additionally provided may be a video navigation module 121 configured to perform video playback in response to user's interaction with the graphical user interface generated by the graphical user interface generation module 120. The operation of the aforesaid modules of the inventive video capture application 115 and the video playback application 119 will be described in detail below.

Figure 2:
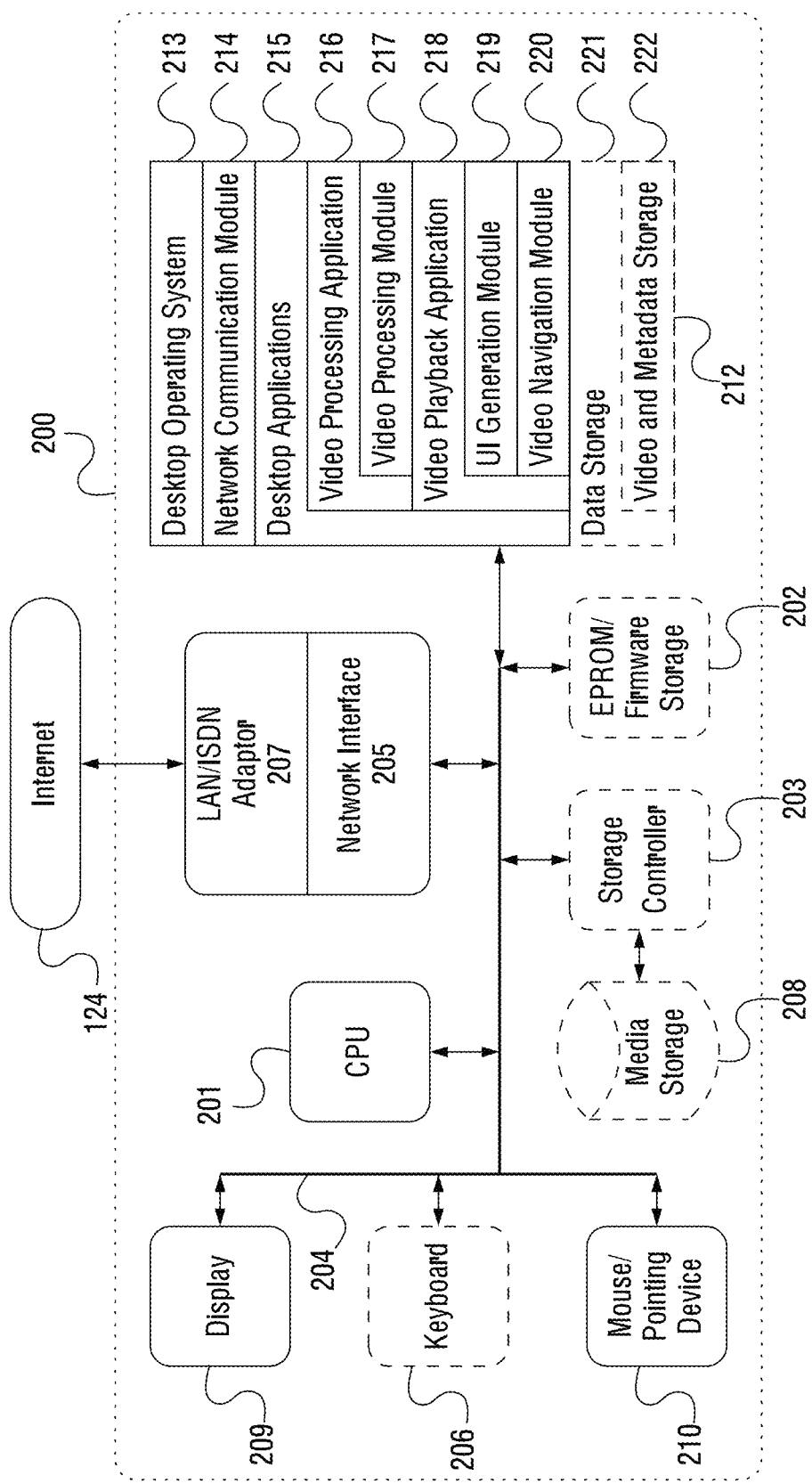
FIG. 2 illustrates an exemplary embodiment of a computerized desktop system for creating spatial overviews for videos and enabling the user to navigate videos during video playback using the created spatial overviews.

In one or more embodiments, the video recorded using the inventive video capture application 115 is processed locally, in the video processing module 118 of the computerized system 100. However, as it would be appreciated by those of skill in the art, the local video processing may demand substantial video processing power, which may not be available in the computerized system 100. Therefore, in an alternative embodiment, the acquired video content may be sent for analysis to a remote computer system, such as the computerized desktop system 200, en exemplary embodiment of which is illustrated in FIG. 2.

In one or more embodiments, the computerized desktop system 200 may incorporate a data bus 204, which may be substantially similar and may perform substantially similar functions as the data bus 104 of the computerized system 100 illustrated in FIG. 1. In various embodiments, the data bus 204 may use the same or different interconnect and/or communication protocol as the data bus 104. The one or more processors (CPUs) 201, the network interface 205, the EPROM/Firmware storage 202, the display 209 and the keyboard 206 of the computerized desktop system 200 may be likewise substantially similar to the respective processor 101, the network interface 105, the EPROM/Firmware storage 102, the display 109 and the keyboard 106 of the computerized system 100, except that the former components are deployed in a desktop platform configuration. In various implementations, the one or more processor 201 may have substantially increased processing power as compared with the processor 101.

In addition to the input device 206 (keyboard), the computerized desktop system 200 may additionally include a cursor control device 210, such as a mouse, a trackball, or cursor direction keys for communicating direction information and command selections to processor 201 and for controlling cursor movement on the display 209. This input device typically has two degrees of freedom in two axes, a first axis (e.g., x) and a second axis (e.g., y), that allows the device to specify positions in a plane.

The LAN/ISDN adaptor 207 of the computerized desktop system 200 may be implemented, for example, using an integrated services digital network (ISDN) card or a modem to provide a data communication connection to a corresponding type of telephone line, which is interfaced with the Internet 124 using Internet service provider's hardware (not shown). As another example, the LAN/ISDN adaptor 207 may be a local area network interface card (LAN NIC) to provide a data communication connection to a compatible LAN and the Internet 124. To store various media files, the computerized desktop system 200 may be provided with a media storage 208 connected to the data bus 204 by means of a storage controller 203.

In one or more embodiments, the memory 212 of the computerized desktop system 200 may store any of the following software programs, applications or modules:

1. Desktop operating system (OS) 213, which may be an operating system for implementing basic system services and managing various hardware components of the computerized desktop system 200. Exemplary embodiments of the desktop operating system 213 are all well known to persons of skill in the art, and may include any now known or later developed operating systems.

2. Network communication module 214 may incorporate, for example, one or more network protocol stacks which are used to establish a networking connection between the computerized desktop system 200 and the various network entities of the Internet 124, such as the computerized system 100, using the network interface 205 working in conjunction with the LAN/ISDN adaptor 207.

3. Desktop applications 215 may include, for example, a set of software applications executed by one or more processors 201 of the computerized desktop system 200, which cause the computerized desktop system 200 to perform certain predetermined functions or tasks. In one or more embodiments, the desktop applications 215 may include an inventive video processing application 216 incorporating a video processing module 217 for generating an overview for captured video by reconstructing a representation of the underlying content and linking from points in the overview to specific points in the video, which may operate substantially similar to the aforesaid module 118 of the computerized system 100. In addition, an inventive video playback application 218, substantially similar to the aforesaid application 119 of the system 100, may also be deployed in the memory 212.

In one or more embodiments, the inventive video playback application 218 may include a graphical user interface generation module 219 configured to generate an inventive graphical user interface providing the novel video navigational capabilities to the user on the display 209 of the computerized desktop system 200. Additionally provided may be a video navigation module 220 configured to perform a video playback in response to user's interaction with the graphical user interface generated by the graphical user interface generation module 219. The user may use the aforesaid user interface to navigate the video by means of the keyboard 206 and the pointing device 210. The operation of the aforesaid modules of the inventive video processing application 216 and the video playback application 218 is substantially similar to the operation of the respective modules of the video capture application 115 and the video playback application 119 and will be described in detail below.

4. Data storage 221 may be used, for example, for storing captured video content 222 as well as other user and/or application data.

In one or more embodiments, the inventive video processing application 216 may be configured to receive the video captured by the computerized system 100 shown in FIG. 1 via the Internet 124 by means of the network interface 205. The received video may be processed using the video processing module 217 and shown to the user using the display 209, having the graphical user interface generated by the user interface generation module 219.

The operation of the various software modules deployed on the computerized system 100 and the computerized desktop system 200 will now be described in detail. As would be appreciated by those of skill in the art, there are several scenarios in which a video captures the progressive accumulation of content. A prominent example is a video from the Khan Academy series, well known to persons of ordinary skill in the art. In these educational videos, the camera focuses on an electronic whiteboard as the presenter adds content with electronic ink. Over the course of the video, annotations are added until the board is filled. Subsequently, the presenter optionally scrolls to an unmarked region of the board to continue to add annotated content.

It should be noted that for the content of this nature, there is a unique relationship between the temporal and spatial dimensions of the content. A natural temporal segmentation of the video identifies the annotations as they are added. This implies that each annotation (and its spatial location in the video frame) is associated with a temporal segment of the video. For such content, it's natural to allow users to navigate video temporally using a spatial index based on the annotations. Therefore, in one or more embodiments, there are provided systems and methods for generating an overview image that displays the complete set of annotations and which is usable for navigating the associated video content.

Figure 3:
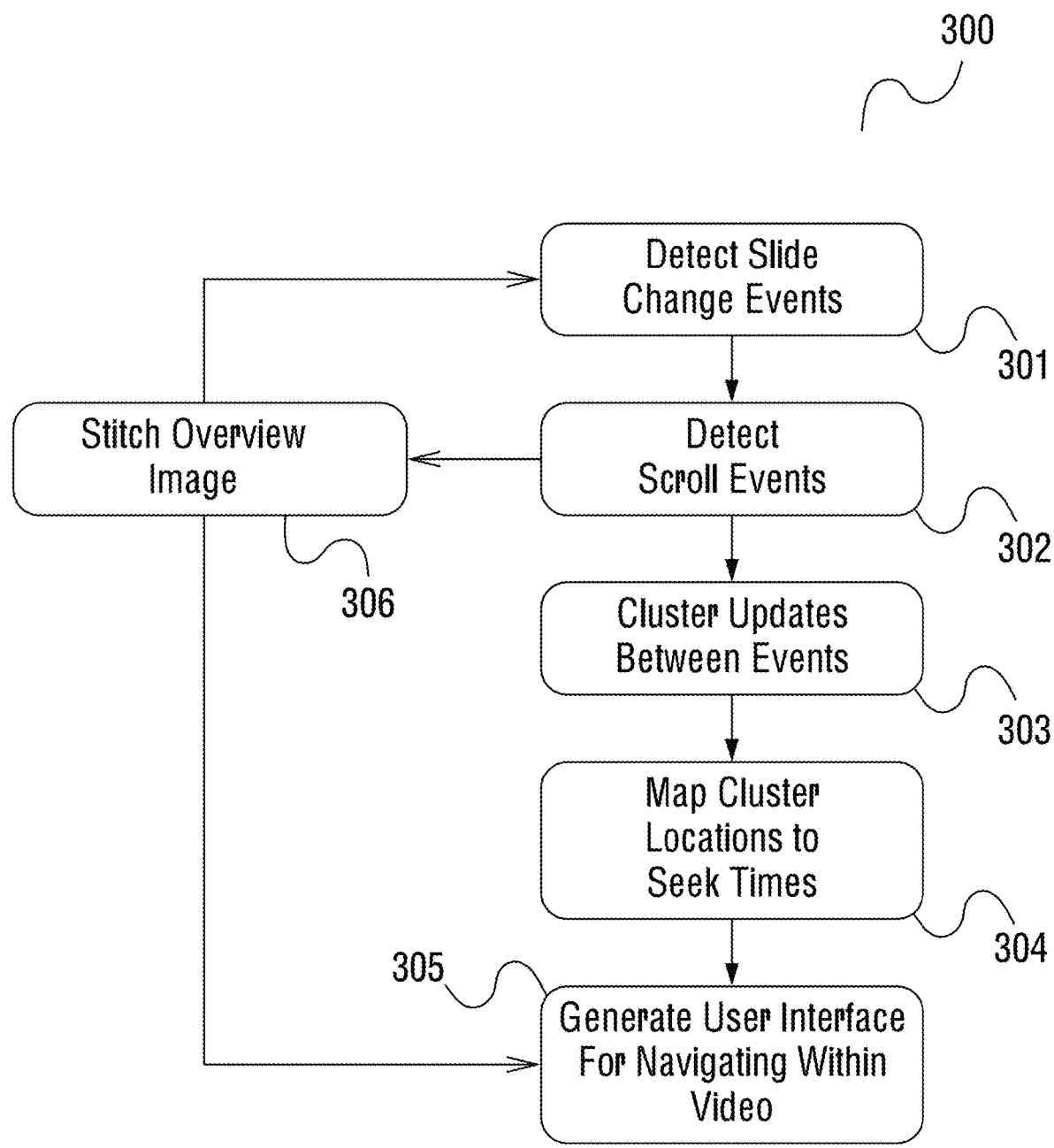
FIG. 3 illustrates an exemplary embodiment of a computerized method for generating overviews for certain two-dimensional content.

An exemplary embodiment of a computerized method 300 for generating overviews for certain two-dimensional content is illustrated in FIG. 3. First, a slide change event is detected in step 301. In one or more embodiments, the slide changes are detected as points of significant change, such as when an annotation is completed. In one or more embodiments, the slide changes are detected using well-known methods described, for example, in U.S. Pat. Nos. 8,261,200 and 8,280,158.

In one or more embodiments, a simple per-pixel frame differencing is first applied to detect changes in the video frames indicating that an annotation is being added. The second step is to apply a temporal threshold for a stable content. As would be appreciated by persons of skill in the art, when the video frame remains stable for a predetermined amount of time, the annotation is likely to have been completed. Thus, the algorithm identifies segments in the video by first detecting periods of change followed by a minimal (at least several seconds long) period of video frame stability.

In one or more embodiments, after the detection of a new annotation event, the method applies spatial analysis using connected components to the difference image created by per-pixel thresholding the last stable video frame (before the new annotation) with the current stable frame (after the annotation). This enables the algorithm to identify a bounding box that delineates the spatial region containing the new annotation.

For each slide change event detected in step 301, the inventive method 300 detects the content scroll event times and their respective scroll offsets in step 302. The width of the bounding box identified in step 301 is a reliable cue for scroll detection. When the width of the bounding box approximates the width of the video (i.e., exceeds a frame-width dependent threshold), the method records a scroll event. The amount of the scroll is detected by aligning the frames before and after the scroll event. In one or more embodiments, this is done efficiently by first selecting a subset of columns with high pixel intensity entropy. Such columns have a range of colors and are more reliable for alignment. Subsequently, the one-dimensional (1D) correlation between the corresponding columns of the video frames is calculated before and after the video scroll event, and the shift producing maximum correlation for each is recorded. The scroll amount is reported as the majority vote among the set of estimated shifts of the individual columns. Alternately, this processing can produce various confidence measures in its estimate to aid in semi-automatic processing or manual correction.

In accordance with the method 300, the slide updates are then stitched into a single image, see step 306. Given the estimates for the amount of scrolling, in step 306, the process stitches the frames collected just before detected scroll events (to maximize annotated content displayed) to create the complete overview image. It should be noted that in general, the overview image height is larger than the height of the video frame, while its width is the same. In accordance with the method 300, a separate process clusters content updates made between scroll events, see step 303. In one embodiment, the scroll times detected in step 302 provide coarse navigation control for the video while the content clusters detected in step 303 provide more fine-grained navigational control, as will be illustrated below in connection with FIG. 4.

In one or more embodiments, the bounding boxes of text added between the scroll events are processed to enhance navigation of the overview image. In one example, hierarchical clustering of the set of detected change bounding boxes is used to flexibly adjust the number (granularity) of time points at which the user can jump into the video. Grouping by time is the most natural approach; however, incorporating spatial information (bounding box locations) into the clustering is a possible extension. This is helpful when the content is added in a consistent manner such as "left to right" or "up to down". In one embodiment, when the user taps an annotation shown in the inventive user interface, the video segment is played that corresponds to the cluster of annotation bounding boxes, as shown in FIG. 4.

After the clusters have been so identified, the cluster locations are mapped to video seek times at step 304, such that user's selecting a particular cluster is translated to specific temporal video segment. Finally, both the overview image generated in step 306 and the mappings generated in step 304 are used in providing a user interface for navigating within video, see step 305.

Figure 4:
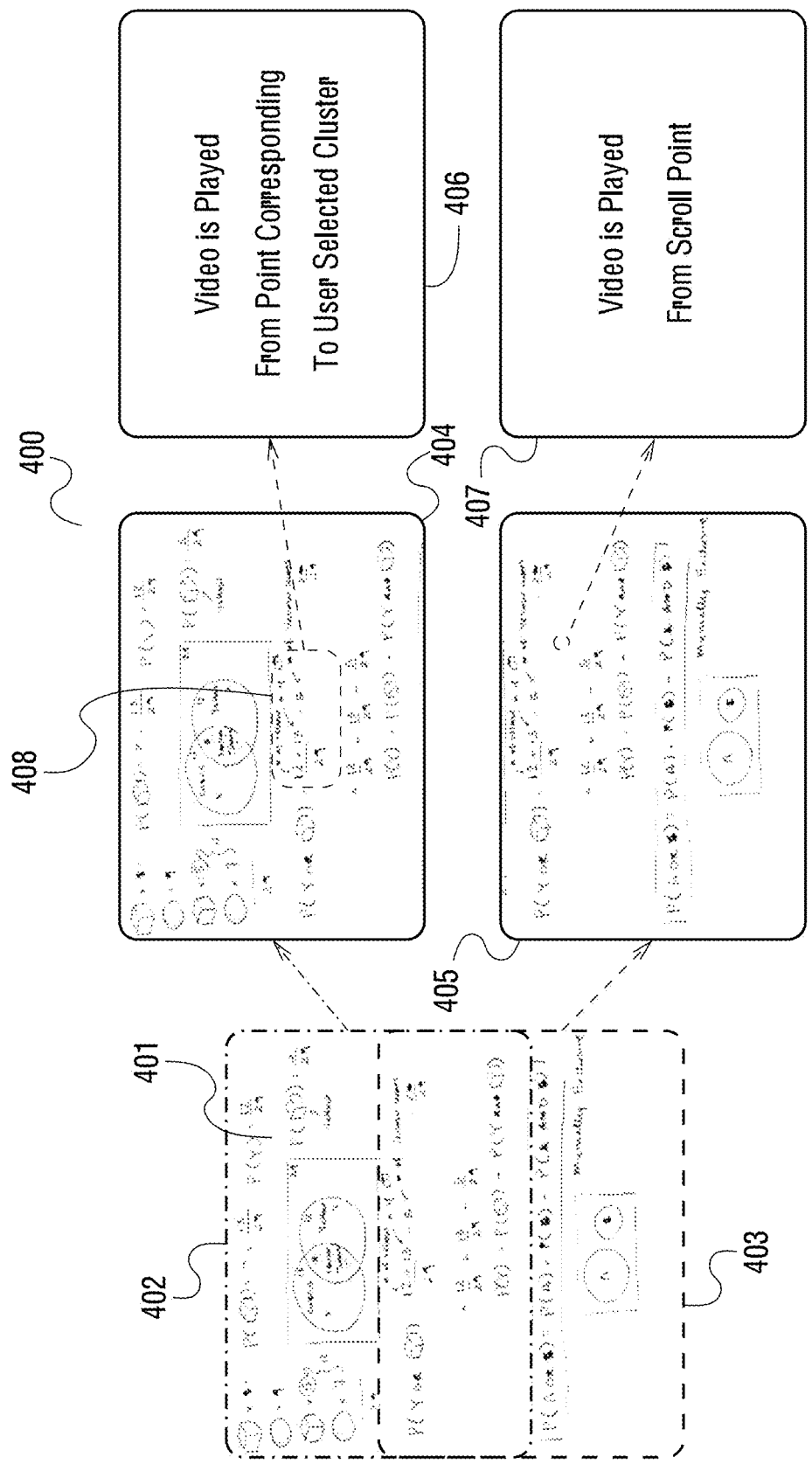
FIG. 4 illustrates an exemplary operation of a user interface for navigating within video using an overview image.

FIG. 4 illustrates an exemplary operation of the user interface 400 for navigating within video using the aforesaid overview image 401. As stated above, the overview image 410 is higher than the height of a standard video frame. In one or more embodiments, the generated user interface 400 enables the user to scroll the overview image 401 between the scroll events detected in step 302, which correspond to scroll positions 402 and 403 shown in FIG. 4. In one embodiment, the inventive user interface 400 may enable the user to navigate (scroll) the overview image 401 using the familiar vertical swiping interaction, which may be detected by the inventive graphical user interface generation modules 120 or 219 by means of the touch-screen interface 110 or pointing device 210, respectively.

Based on the user's scroll selection, the user interface 400 shows either a video frame 404 before the scroll event, or a later video frame 405 after the scroll event and the subsequent addition of annotations. As can be seen from FIG. 4, the shown video frame 404 corresponds to the upper (earlier in time) portion 402 of the overview image 401, while the video frame 405 corresponds to the lower (later in time) portion 403 of the overview image 401. In one or more embodiments, the inventive video navigation module 121 is configured to detect an event, when the user selects a cluster within a specific video frame, such as cluster 408 within frame 404. Upon detection of such cluster selection by the user, the video navigation module 121 is configured to play a video segment 406 in which the annotations within the selected cluster were added. The start time of the aforesaid segment is determined based on the mapping generated in step 304 of the process of FIG. 3. In one embodiment, the segment may include a portion of the video between the scroll events.

In one or more embodiments, when the user taps the screen with one finger the system navigates the video to the selected scroll event time, hides the screens 404 or 405 with the portions of the overview image 401, and begins playing the video, see 407. The user can return back to the overview image by tapping the screen with two fingers simultaneously.

It should be noted that the embodiment of the method 300 illustrated in FIG. 3 can also be applied to videos that overlay slide streams with electronic ink. In this case, the slide change detection step 301 shown in FIG. 3 identifies new slides. This data resembles the projector-based video streams described, for example, in the aforesaid U.S. Pat. No. 8,261,200 and related keyframe selection techniques can be used, again relying primarily on detecting pixel level changes. As would be appreciated by persons of skill in the art, scrolls are uncommon in this class of videos. However, a single slide can be shown for more extended periods of time. In such a case, the addition of ink stroke clustering and bounding box detection described herein can be helpful as before.

Therefore, an embodiment of the inventive graphical user interface generated by the graphical user interface generation modules 120 and 219, may display all distinct slides to the user, wherein the slides are shown with all added annotations. Such an interface may provide the user with a hierarchical non-linear access to the respective segments of the video. In accordance with one or more embodiments, users can first indicate a slide segment of interest, which is detected by the inventive user interface. By again selecting an annotation shown on the overview thumbnail for that slide segment, users are enabled to navigate to the sub-segment in which the annotation is added and cause the corresponding video segment to be played.

It should be also noted that the above-described techniques are not limited to creating navigable overviews for videos of annotations or other content added using electronic ink to electronic whiteboards or to any other specific types of content or medium. Substantially the same techniques may be used in relation to any content added to any medium what so ever.

In one or more embodiments, the aforesaid overview image is also generated for videos of three-dimensional articles. However, in this case, it is not sufficient to simply make a flat map of the article as in the embodiment described above. Therefore, in one or more embodiments, for three-dimensional articles, camera orientation information is captured by the positioning and orientation module 103 simultaneously with the video recorded by the camera 111 in order to subsequently select video frames that represent different sides of the article. The term "orientation" as used herein means global compass direction as well as camera tilt. These two orientation parameters are recorded simultaneously during the video recording, stored in the data storage 122 and are subsequently used to locate video frames corresponding to a given side of the article.

Figure 5:
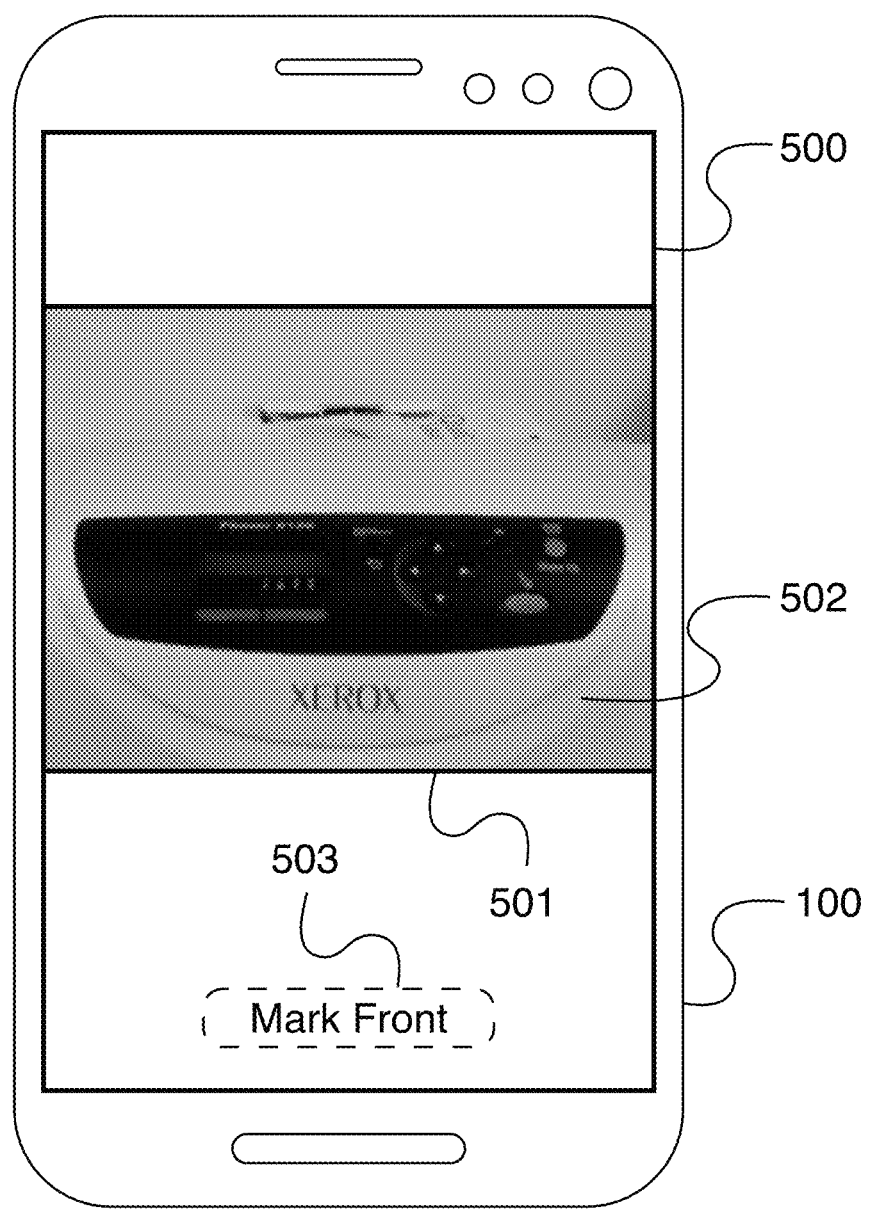
FIG. 5 illustrates an exemplary embodiment of a graphical user interface of a video capture application.

Additionally, because the article may itself be oriented in any direction, in one or more embodiments, the user is asked to provide an orientation registration point mapping the recorded orientation to the front of the article with no tilt (e.g., a straight-on shot). FIG. 5 illustrates an exemplary embodiment of a graphical user interface 500 of a video capture application 115 displayed on the display device 109 of the computerized system 100. The interface 500 comprises a live video portion 501 showing a real-time video 502 from the camera 111, which functions as a viewfinder for the aforesaid camera 111. Additionally provided is a mark front button 503, which the user can activate to mark the straight-on shot of the front of the article. The video capture module 117 of the application 115 is configured to simultaneously record the video, as well as the associated metadata including camera orientation and user's designation of the straight-on shot of the front of the article. The recorded information is stored in the video and metadata storage portion 123 of the data storage 122.

Figure 6:
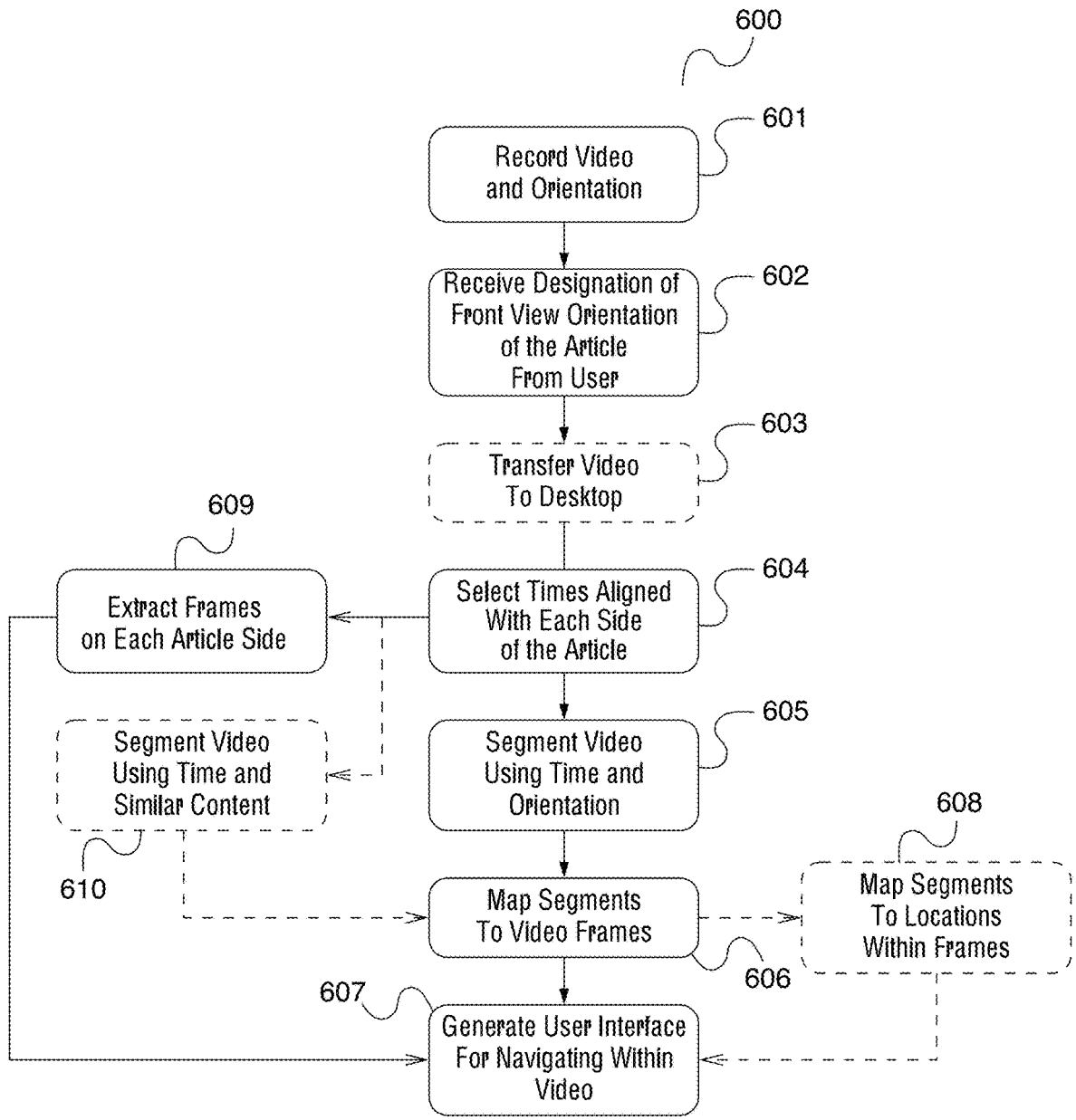
FIG. 6 illustrates an exemplary embodiment of a method for capturing and processing the video of an article and generating the video overview usable for video navigation.

FIG. 6 illustrates an exemplary embodiment of a method 600 for capturing and processing the video of the article and generating the video overview usable for video navigation. First, the video and the related metadata, including the orientation information, are captured in step 601. The user's designation of the front view of the article is detected in step 602, using, for example, the aforesaid button 503 of the user interface 500. Optionally, at step 603, the captured video and the associated metadata may be transferred from the computerized system 100 to the computerized desktop system 200 for processing.

At step 604, time ranges at which the orientation of the camera 111 is roughly on one of each of the six sides of the article are selected. At step 609, the video processing modules 118 or 217 select six video frames from the recorded video, which are proximate to the sides of the article. The selected video frames may correspond to the adjusted camera compass directions of 0, 90, 180, and 270 degrees with no tilt, as well as one video frame at a tilt of 90 degrees, and one video frame at a tilt of 270 degrees. In one or more embodiments, if the frame corresponding to one of the aforesaid compass directions is not available in the captured video, the video processing modules 118 or 217 are configured to simply skip this article side. In one or more embodiments, the video processing modules 118 or 217 utilize simple sharpness measures to filter frames with orientations that match a particular article side. If multiple frames match a particular side and are sufficiently sharp, the earliest frame is selected on the hypothesis that a user recording a video is likely to shoot overview shots first, before shooting close-ups.

Subsequently, the method 600 clusters frames of the captured video close in time and orientation and segments the video accordingly, see step 605. In one or more embodiments, the video is segmented by thresholding absolute value of the difference between camera orientation and the aforesaid orientation registration point. Additionally or alternatively, the video may be segmented based on the content, using content matching techniques well known to persons of ordinary skill in the art, see step 610. In one or more embodiments, the video segmentation based on content is performed using image analysis or image matching techniques. For example, in one embodiment, the image processing modules 118 and 217 are configured to extract image features for each video frame in the video, such as scale-invariant feature transform (SIFT) image features well known to persons of skill in the art. The extracted image features are subsequently compared with image features of the video frames selected in step 609. Video frames that are similar, as determined by the number of matching image features, are included in the same segment during the segmentation step. In an alternative implementation, video frames may be compared to one another without the use of the frames selected in step 609 in order to find segments of frames having similar content. The resulting video segments are mapped to the selected video frames in step 606 and the frames as well as the mapped video segments are sent to the user interface for video navigation. In one or more embodiments, image or content matching algorithms are additionally used to map sub-segments of the video to specific locations within the selected frame, see step 608. Information on these video frame sub-regions as well as the linked video sub-segments is also sent to the user interface generated in step 607 to allow the users to click within a selected frame for more fine-grained video navigation.

The method of selecting the frames for each side of the article performed in step 609 is illustrated in connection with FIG. 7. The compass orientation of the camera is recorded along with the video, as a function of time 703 and angle 702, see graph 701. After the user designates the front view of the article, the compass angles are transformed into article-centric angles, see graph 704. The video is then segmented based on these angles with 0 degree, 90 degree and 180 degree marks on the vertical angle axis 705 corresponding to each shown side of the article. Within each segment, the orientation deviation from "straight on" direction is indicated by graph 707 as a function of the angle 708 and time 703. The selected frame (keyframe) positions 713, 714 and 715 are found by jointly maximizing the image quality 711 measure 710 (such as a sharpness measure) and, at the same time, minimizing the deviation from "straight on" 707 for each camera 111 orientation. This is performed to choose the highest quality image (video frame) corresponding to a particular orientation to be the representative image for that orientation. In one or more embodiments, the keyframes 713, 714 and 715 are determined using optimization techniques for a function of two variables (image quality and deviation from "straight on"), which are well known to persons of skill in the art. For example, optimization may be performed by finding local maximums and local minimums of such function at critical points. In one or more embodiments, the keyframe positions 713, 714 and 715 may be determined using iterative techniques.

Figure 7:
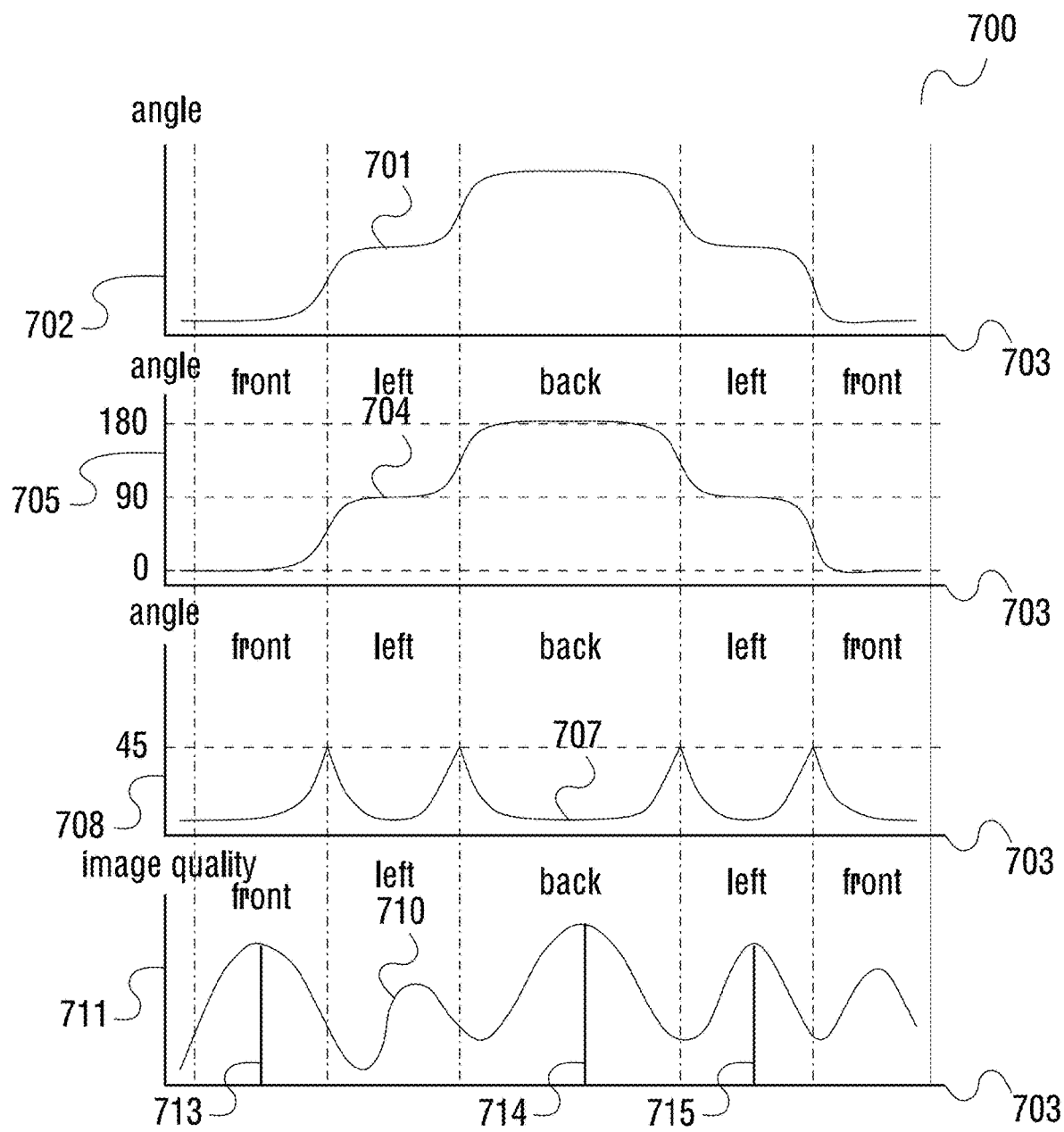
FIG. 7 illustrates an exemplary embodiment of a method for selecting video frames corresponding to each side of the article.

It should be noted that the example shown in FIG. 7 excludes a view from the right side of the article and right-side view would not be included in the generated overview. For clarity, this figure does not illustrate selection of views from the top and bottom, but they would be selected similarly using the vertical tilt angle in place of the compass orientation angle.

Figure 8:
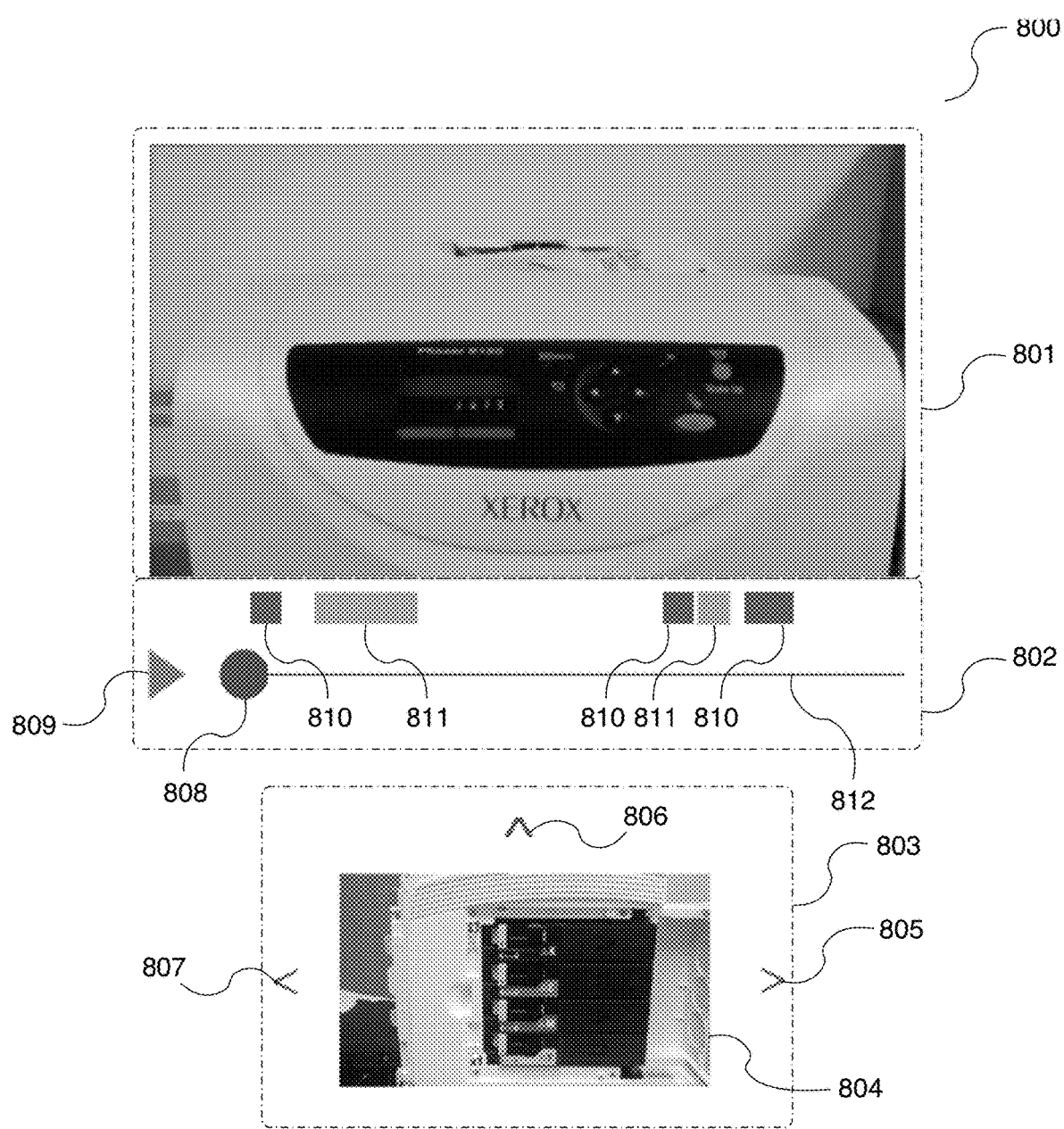
FIG. 8 illustrates an exemplary embodiment of a graphical user interface for navigating a video using the created video overview.

FIG. 8 illustrates an exemplary embodiment of a graphical user interface 800 for navigating a video using the created video overview. The shown embodiment of the user interface 800 includes a video playback portion 801, a temporal navigation portion 802 and an overview portion 803. The overview portion 803 displays a representative video frame 804, corresponding to one of the sides of the article, selected in step 609 of the method 600 shown in FIG. 6. It also incorporates controls 805, 806 and 807 for selecting frames corresponding to other article sides. Segments of the video corresponding to the article side 804 presently displayed in the overview portion 803 are marked in a video timeline 812 of the temporal navigation portion 802 using colored segments 811. These video segments may be automatically or manually played by the user in the video playback portion 801, using video controls 808 and 809. Specifically, in one embodiment, the appropriate video segment may be automatically played upon selection of a frame corresponding to a specific article side by the user. Video segments corresponding to other sides of the article are marked on the timeline 812 using segments 610 of different color.

Figure 9:
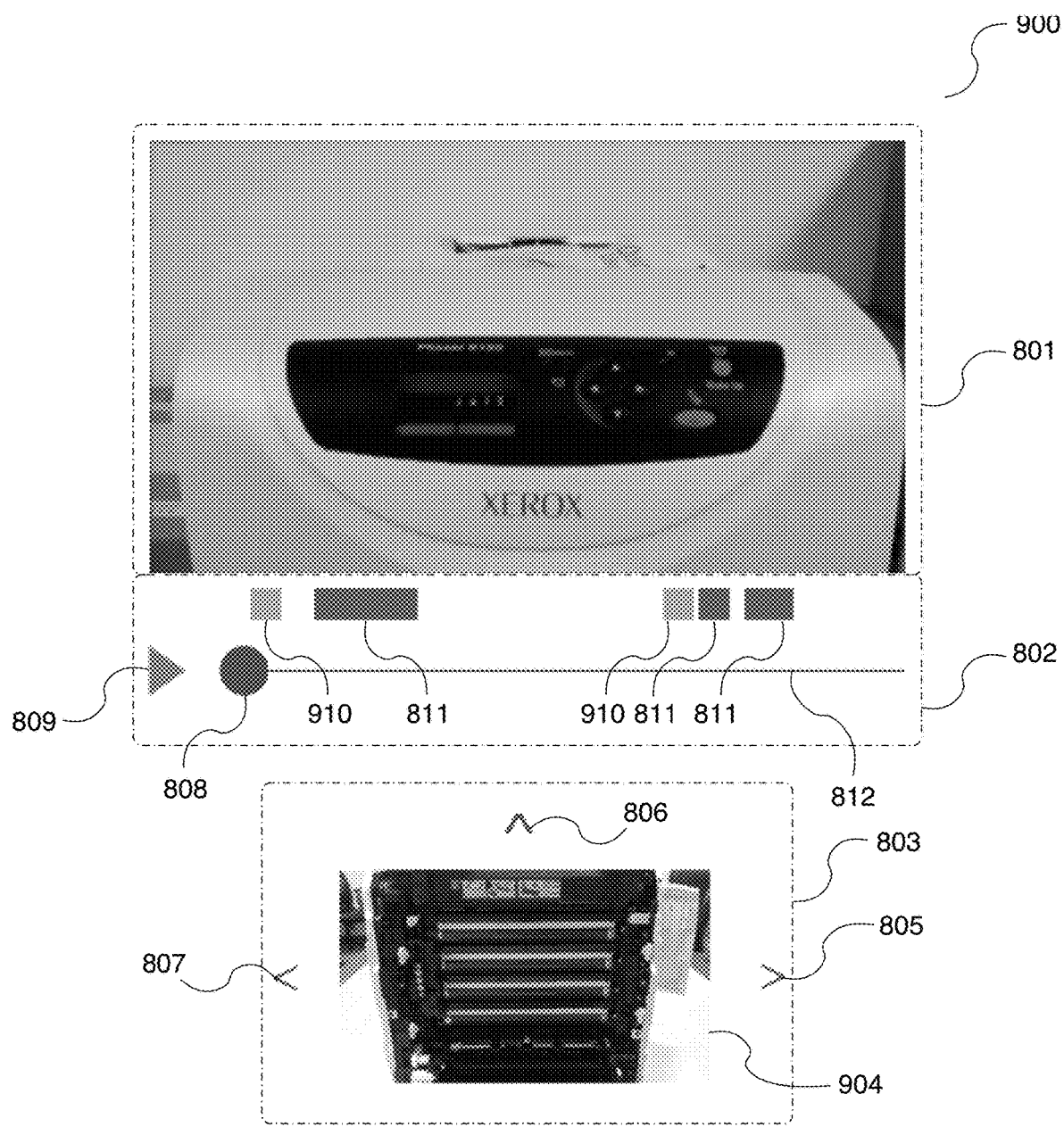
FIG. 9 illustrates another exemplary embodiment of a graphical user interface for navigating a video using the created video overview.
Figure 10:
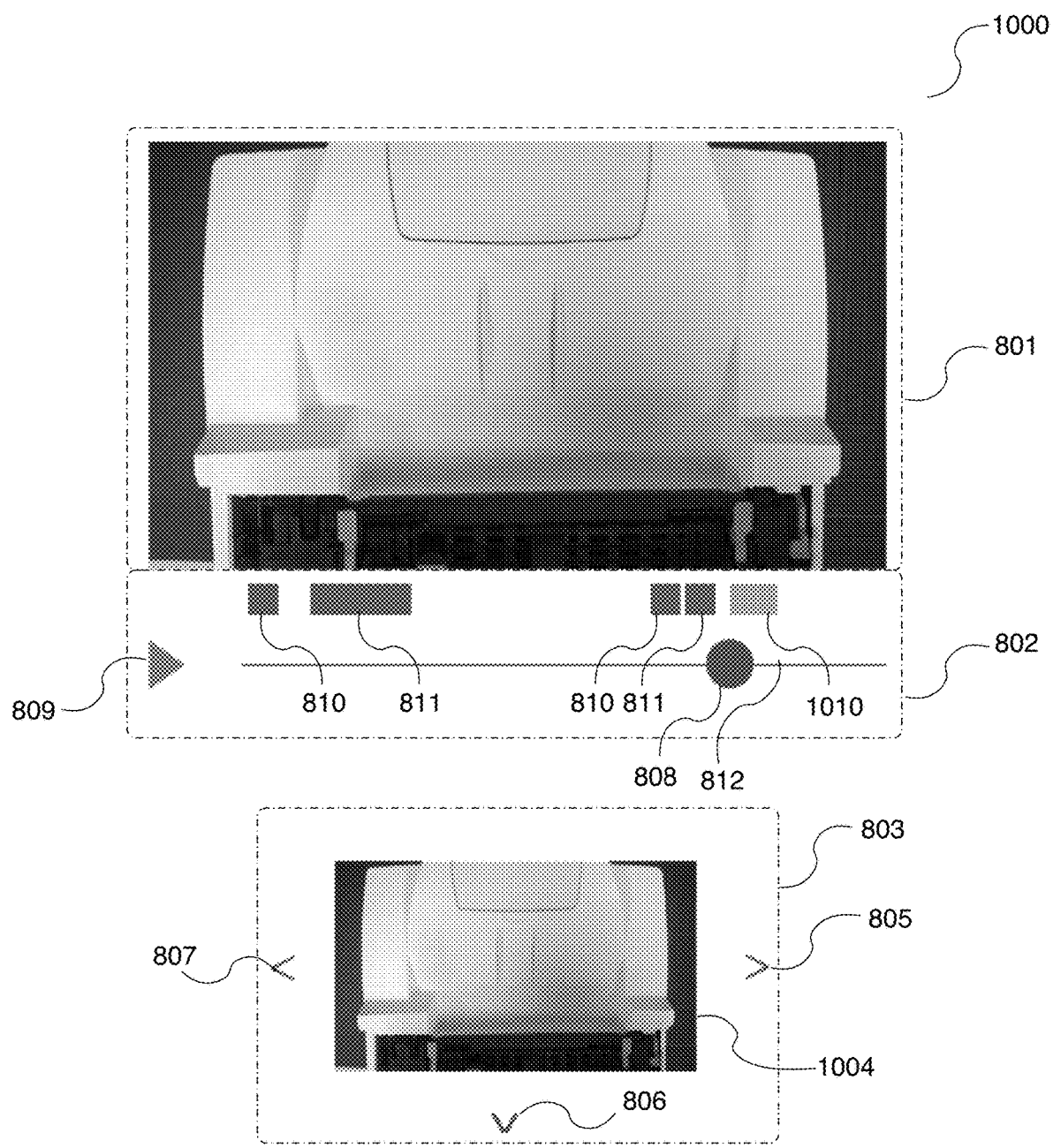
FIG. 10 illustrates yet another exemplary embodiment of a graphical user interface for navigating a video using the created video overview.

FIG. 9 illustrates another exemplary embodiment of a graphical user interface 900 for navigating a video using the created video overview. In that figure, the overview portion 803 displays a frame 904 corresponding to a different side of the article. The video segments linked to the displayed article side are marked on the video timeline 812 with colored segments 910. Likewise, in the embodiment 1000 shown in FIG. 10, the video frame corresponding to the top side of the article is shown in the overview portion 803. The video segments linked to the displayed article side are marked on the video timeline 812 with colored segments 1010. It should be noted that the images of the sides of the article displayed in the overview portion 803 need not necessarily be video frames taken from the video of the article. Any other images of the article that could be mapped to appropriate video segments may likewise be used for video navigation.

Figure 11:
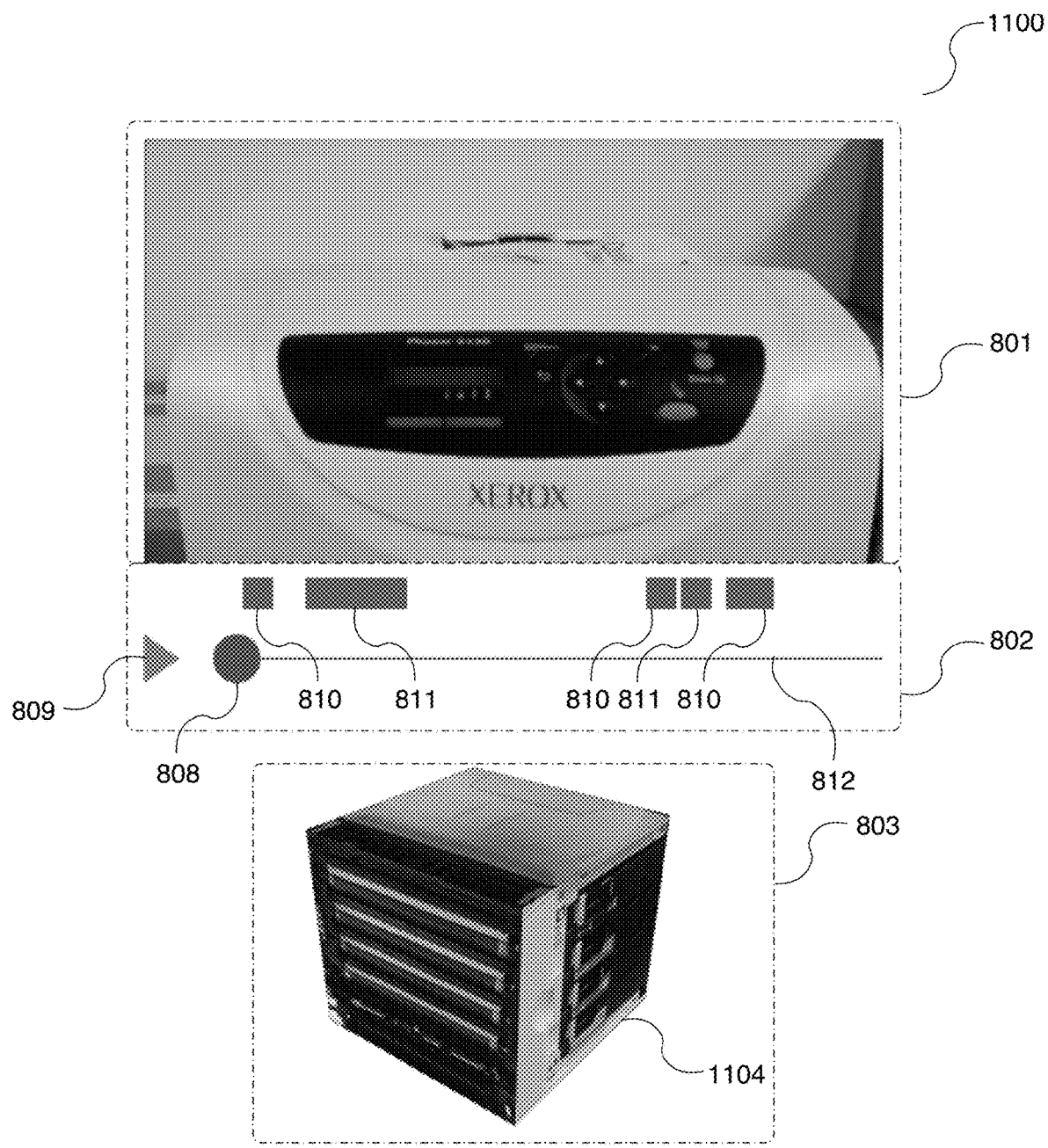
FIG. 11 illustrates an exemplary embodiment of a graphical user interface in which the overview image has been stitched into a three-dimensional cube.

FIG. 11 illustrates an exemplary embodiment of a graphical user interface 1100 in which the overview image 1104 has been stitched into a three-dimensional cube, which can be manipulated by the user directly using the touchscreen interface 110 or the pointing device 210. When the cube is positioned by the user in the overview portion 803 to primarily show one specific side thereof, as may be determined using the current view angle, the video segment(s) corresponding to the shown side are appropriately marked in the video timeline 812.

The above description was related to the case in which the overview was generated from the source video itself. However, in some cases, a three-dimensional (3D) model of the recorded article may be available. For example, such model may be available from a third-party database. In various embodiments, three-dimensional models of articles may also be generated by stitching multiple unordered partial three-dimensional article models. Thus, the inventive techniques described herein are not limited to any specific types of the utilized three-dimensional article models or the manner in which such models have been created.

Figure 12:
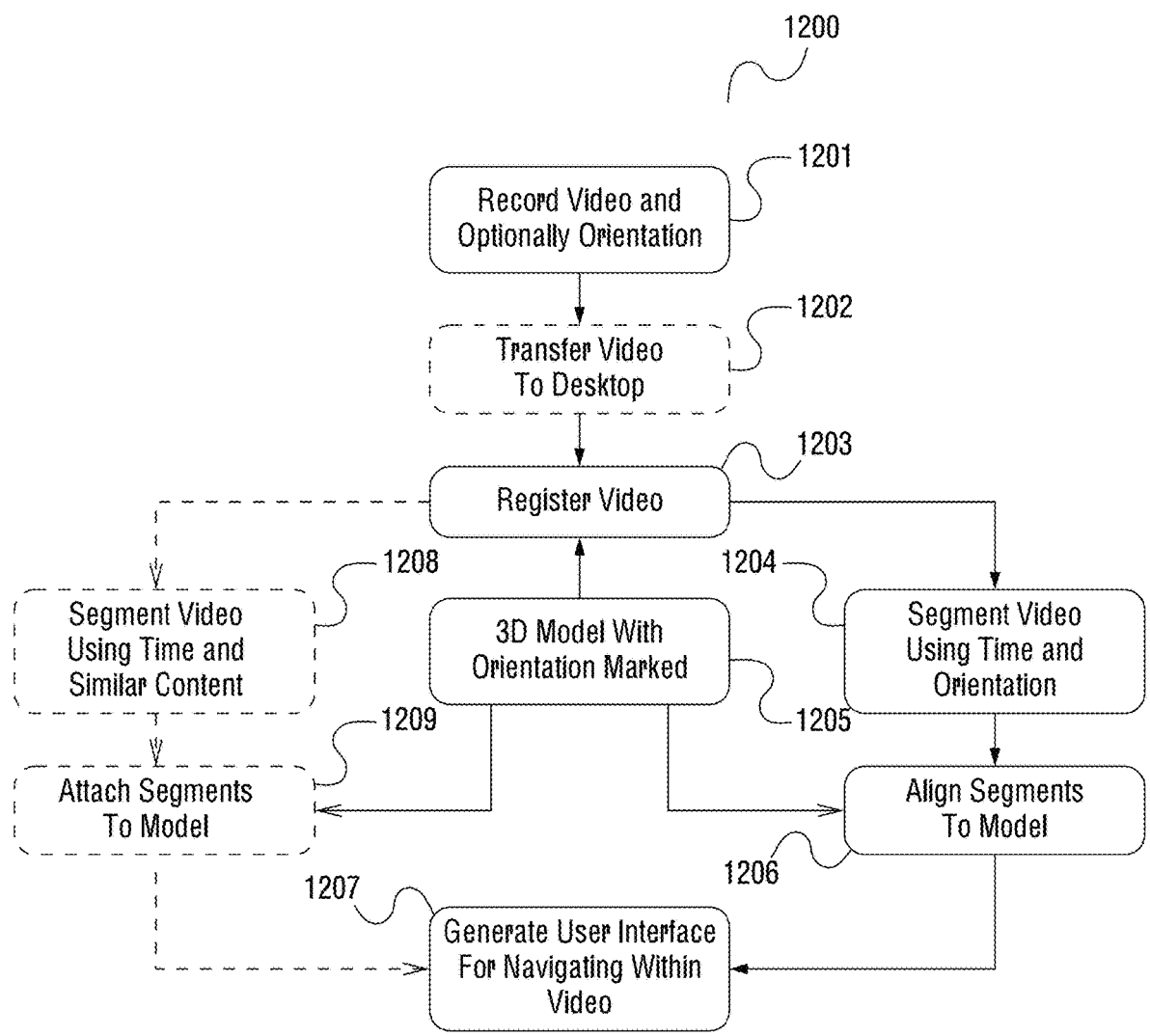
FIG. 12 illustrates an exemplary embodiment of a method for processing a video of an article when a corresponding three-dimensional model is available.

FIG. 12 illustrates an exemplary embodiment 1200 of a method for processing a video of an article when a corresponding three-dimensional model 1205 is available. First, at step 1201, the video of the article and, optionally, the camera orientation metadata is captured. Optionally, at step 1202, the captured video and metadata may be sent from the computerized system 100 to the computerized desktop system 200 for processing. The video is subsequently registered (linked) to the three-dimensional model of the corresponding article in step 1203. In one embodiment, to link the video to the provided three-dimensional model, the video processing modules 118 and 217 use the orientation metadata as described above. In this embodiment, the user is asked to mark the front of the article during the video recording, for example using the mark front button 503 shown in FIG. 5, to provide a registration point. The image processing modules 118 and 217 then use the camera orientation information together with the marked front side shot of the article to align the video with the three dimensional model. In an alternative embodiment, the video processing modules 118 and 217 utilize image matching techniques well known to persons of skill in the art to link a single point on the three dimensional model to a point in the captured video and use the camera orientation information to achieve the video-to-model alignment. In yet alternative embodiment, the image processing modules 118 and 217 may link the video and the three-dimensional model using only image (content) matching and without the use of any camera orientation metadata.

In the above-described embodiments, the video is subsequently segmented as described above using the time and the orientation metadata, see step 1204. The resulting video segments are aligned to the model in step 1206. These video segments can then be sent to the user interface generated in step 1207 directly as orientation/time pairs. In one or more embodiments, the graphical user interface filters the visible views based on the current view angle of the interactive overview model and marks the corresponding video segments in a manner similar to the one used in the embodiments shown in FIGS. 8-11.

In one or more embodiments, for more fine-grained placement of video segments on the model, the image processing modules 118 and 217 may instead rely on image (content) matching for segmentation and linking segments to the model, see steps 1208 and 1209. For example, it could attempt to match the entire video against the available three-dimensional model using methods, well known to persons of ordinary skill in the art. Alternatively, the image processing modules 118 and 217 can segment the video into highly similar segments, based on appearance or motion features, and then align a representative image from each segment to the three-dimensional model, substantially as described above. In either case the segmentation provides way to anchor the visualization, because the graphical user interface can depict an entire segment pose as a point directly on the model, as will be illustrated in connection with FIG. 13. For instance, in one or more embodiments, the center of the matched image, or average center of the matched images, are presented on the three-dimensional overview model and linked to the appropriate segment.

Figure 13:
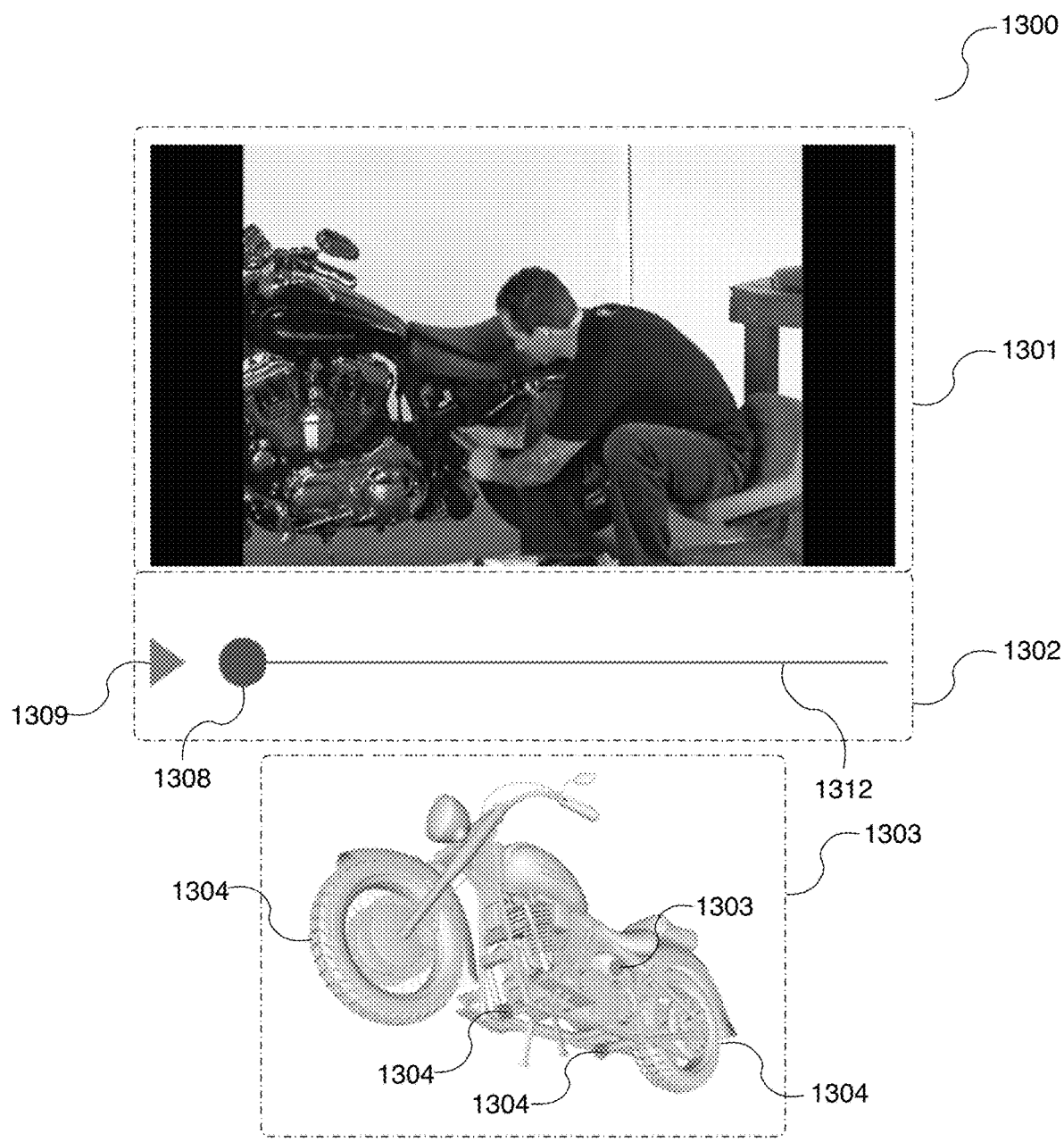
FIG. 13 illustrates an exemplary embodiment of a graphical user interface for navigating a video using an overview based on a three-dimensional model of an article depicted in the video.

FIG. 13 illustrates an exemplary embodiment of a graphical user interface 1300 for navigating a video using an overview based on a three-dimensional model of an article depicted in the video. The graphical user interface 1300 incorporates a video playback portion 1301, a temporal navigation portion 1302 with controls 1308 and 1309 and an overview portion 1303. The overview portion 1303 displays a view on the three-dimensional model 1304 of an article depicted in the video playback portion 1301. Specific locations on the three-dimensional model 1304 linked to the respective video segments are marked with colored user-selectable dots 1305, 1306 and 1307. When the user selects a marked dot, the corresponding video segment is played in the video playback portion 1301. The user-selectable dot corresponding to the video, which is currently being played in the playback portion 1301 (dot 1303 in FIG. 13 has been selected by the user and the corresponding video segment is being played) may be marked in a different color from the remaining dots (1304).

Figure 14:
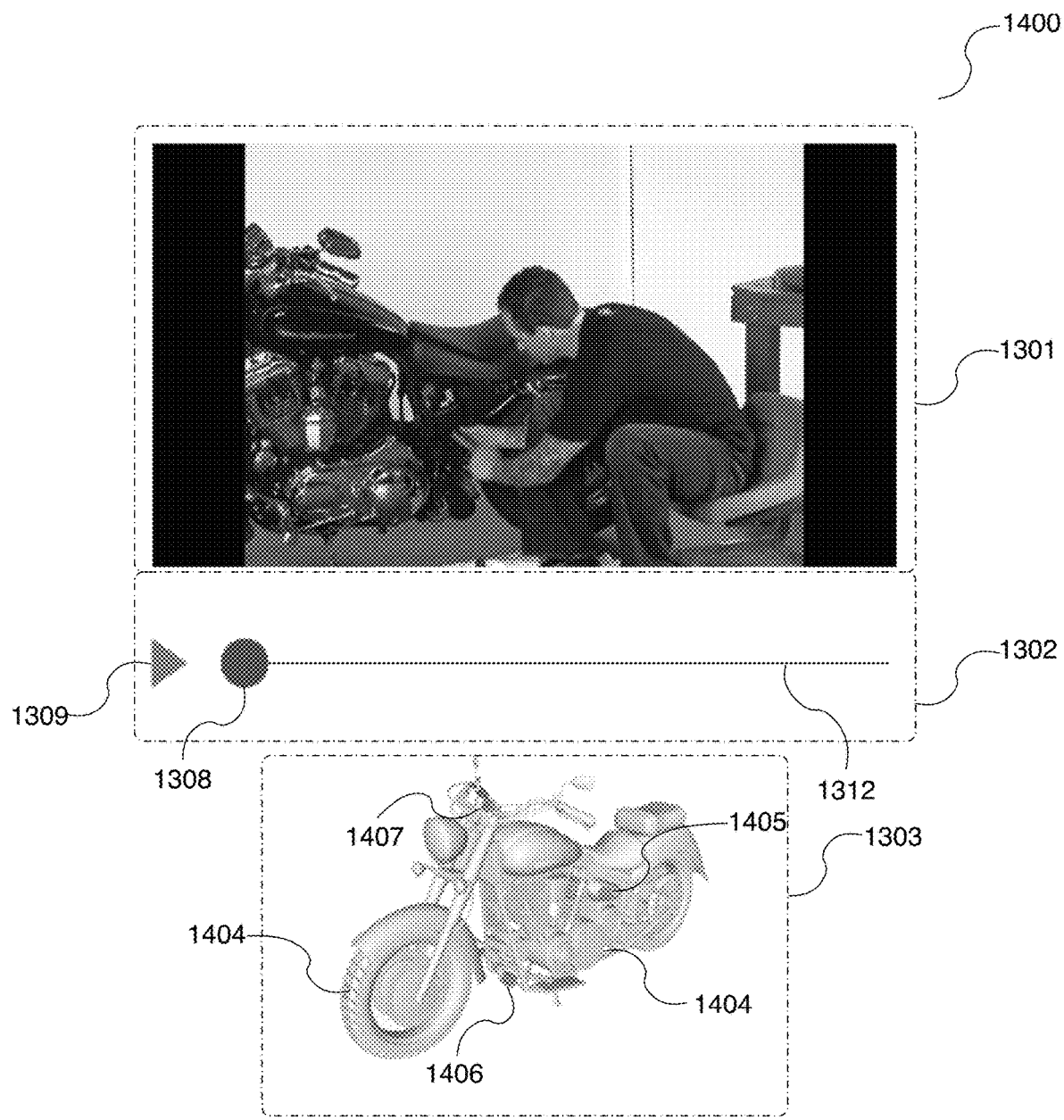
FIG. 14 illustrates another exemplary embodiment of a graphical user interface for navigating a video using an overview based on a three-dimensional model of an article depicted in the video.

FIG. 14 illustrates another exemplary embodiment of a graphical user interface 1400 for navigating a video using an overview based on a three-dimensional model of an article depicted in the video. The overview portion 1303 of the interface 1400 depicts the three-dimensional model 1404 that has been rotated by the user. When the model is so rotated, view other available mapped video segments come into view, which are marked on the model with user-selectable colored dots 1405, 1406 and 1407. The user-selectable dot corresponding to the video, which is currently being played in the playback portion 1301 (dot 1405 in FIG. 14 has been selected by the user and the corresponding video segment is being played) may be marked in a different color from the remaining dots (1406 and 1407).

As would be understood by persons of ordinary skill in the art, the techniques described herein may be used in connection with any two or three-dimensional articles and/or article models. In case of a two-dimensional article, video frames corresponding to just two sides of the article (front and back) and the associated mapped video segments may be used for video navigation.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for generating and using navigable spatial overviews for video. It is intended that the specification and examples be considered as exemplary only, with a true scope and spirit of the invention being indicated by the following claims.

What is claimed is:

1. A computer-implemented method performed in a computerized system comprising a central processing unit, a display device and a memory, the computer-implemented method performed in connection with a video of an article having multiple sides recorded from a camera, the computer-implemented method comprising:
   a. using the central processing unit to segment the video into a plurality of video segments based at least on time metadata and camera orientation metadata, each video segment representing a continuous time range of the video based on the time metadata and comprising a plurality of video frames of the video that correspond to a side of the article, wherein correspondence of each video frame to a respective side is based on the camera orientation metadata and a designation of a front side orientation of the article, and wherein the camera orientation metadata had been simultaneously recorded with the video by the camera, includes at least parameters of a global compass direction and a camera tilt that describe a plurality of orientations of the camera when recording the multiple sides of the article, and is stored in the memory;
   b. using the central processing unit to (i) select a plurality of video frames from the video, each selected video frame being an image corresponding to a side of the article based on the camera orientation metadata and the designation of the front side orientation of the article and (ii) map each image of the plurality of images to multiple video segments of the plurality of video segments that correspond to the side of the article of the respective image, wherein at least two of the multiple video segments are temporally separated by at least another video segment that does not correspond to the side of the article of the respective image;
   c. generating a graphical user interface on the display device, the graphical user interface comprising a video playback portion and an overview portion, wherein the graphical user interface displays, in the overview portion, at least one of the plurality of images and controls for user selection of one image of the at least one of the plurality of images; and
   d. playing at least one of the multiple of video segments in the video playback portion mapped to the one image of the at least one of the plurality of images based on the user selection of the one image of the at least one of the plurality of images.

2. The computer-implemented method of claim 1, wherein the video frame is selected from the video based on an image quality of the video frame.

3. The computer-implemented method of claim 2, wherein the selected video frame is a highest quality video frame corresponding to a camera orientation closest to an orientation of a respective one of the plurality of sides of the article.

4. The computer-implemented method of claim 1, wherein the front side orientation of the article is designated by a user.

5. The computer-implemented method of claim 1, wherein the video is segmented additionally based on a content of the video by comparing image features extracted from frames of the video with image features extracted from the plurality of images.

6. The computer-implemented method of claim 1, further comprising using the central processing unit to map a location within at least one of the plurality of images to at least one of the plurality of video segments, wherein upon detection of a selection event of the location within the at least one of the plurality of images by a user, the mapped at least one of the plurality of video segments is played.

7. The computer-implemented method of claim 1, further comprising marking the multiple video segments mapped to the one image selected by a user on a timeline of the video.

8. The computer-implemented method of claim 1, wherein the graphical user interface displays at least two of the plurality of images, stitched into a three-dimensional model, the graphical user interface comprising controls for manipulating the displayed three-dimensional model.

9. A non-transitory computer-readable medium embodying a set of computer-executable instructions, which, when executed in a computerized system comprising a central processing unit, a display device and a memory in connection with a video of an article having multiple sides recorded from a camera, cause the computerized system to perform a method comprising:
   a. using the central processing unit to segment the video into a plurality of video segments based at least on time metadata and camera orientation metadata, each video segment representing a continuous time range of the video based on the time metadata and comprising a plurality of video frames of the video that correspond to a side of the article, wherein correspondence of each video frame to a respective side is based on the camera orientation metadata and a designation of a front side orientation of the article, and wherein the camera orientation metadata had been simultaneously recorded with the video by the camera, includes at least parameters of a global compass direction and a camera tilt that describe a plurality of orientations of the camera when recording the multiple sides of the article, and is stored in the memory;
   b. using the central processing unit to (i) select a plurality of video frames from the video, each selected video frame being an image corresponding to a side of the article based on the camera orientation metadata and the designation of the front side orientation of the article and (ii) map each image of the plurality of images to multiple video segments of the plurality of video segments that correspond to the side of the article of the respective image, wherein at least two of the multiple video segments are temporally separated by at least another video segment that does not correspond to the side of the article of the respective image;
   c. generating a graphical user interface on the display device, the graphical user interface comprising a video playback portion and an overview portion, wherein the graphical user interface displays, in the overview portion, at least one of the plurality of images and controls for user selection of one image of the at least one of the plurality of images; and
   d. playing at least one of the multiple of video segments in the video playback portion mapped to the one image of the at least one of the plurality of images based on the user selection of the one image of the at least one of the plurality of images.

10. The non-transitory computer-readable medium of claim 9, wherein the video frame is selected from the video based on an image quality of the video frame.

11. The non-transitory computer-readable medium of claim 10, wherein the selected video frame is a highest quality video frame corresponding to a camera orientation closest to an orientation of a respective one of the plurality of sides of the article.

12. The non-transitory computer-readable medium of claim 9, wherein the front side orientation of the article is designated by a user.

13. The non-transitory computer-readable medium of claim 9, wherein the video is segmented additionally based on a content of the video by comparing image features extracted from frames of the video with image features extracted from the plurality of images.

14. The non-transitory computer-readable medium of claim 9, further comprising using the central processing unit to map a location within at least one of the plurality of images to at least one of the plurality of video segments, wherein upon detection of a selection event of the location within the at least one of the plurality of images by a user, the mapped at least one of the plurality of video segments is played.

15. The non-transitory computer-readable medium of claim 9, further comprising marking the multiple video segments mapped to the one image selected by a user on a timeline of the video.

16. A computerized system comprising a central processing unit, a display device and a memory storing a set of instructions executable in connection with a video of an article having multiple sides recorded from a camera, the set of instructions including instructions for:
   a. using the central processing unit to segment the video into a plurality of video segments based at least on time metadata and camera orientation metadata, each video segment representing a continuous time range of the video based on the time metadata and comprising a plurality of video frames of the video that correspond to a side of the article, wherein correspondence of each video frame to a respective side is based on the camera orientation metadata and a designation of a front side orientation of the article, and wherein the camera orientation metadata had been simultaneously recorded with the video by the camera, includes at least parameters of a global compass direction and a camera tilt that describe a plurality of orientations of the camera when recording the multiple sides of the article, and is stored in the memory;
   b. using the central processing unit to (i) select a plurality of video frames from the video, each selected video frame being an image corresponding to a side of the article based on the camera orientation metadata and the designation of the front side orientation of the article and (ii) map each image of the plurality of images to multiple video segments of the plurality of video segments that correspond to the side of the article of the respective image, wherein at least two of the multiple video segments are temporally separated by at least another video segment that does not correspond to the side of the article of the respective image;
   c. generating a graphical user interface on the display device, the graphical user interface comprising a video playback portion and an overview portion, wherein the graphical user interface displays, in the overview portion, at least one of the plurality of images and controls for user selection of one image of the at least one of the plurality of images; and
   d. playing at least one of the multiple of video segments in the video playback portion mapped to the one image of the at least one of the plurality of images based on the user selection of the one image of the at least one of the plurality of images.

* * * * *